Patented Sept. 21, 1926.

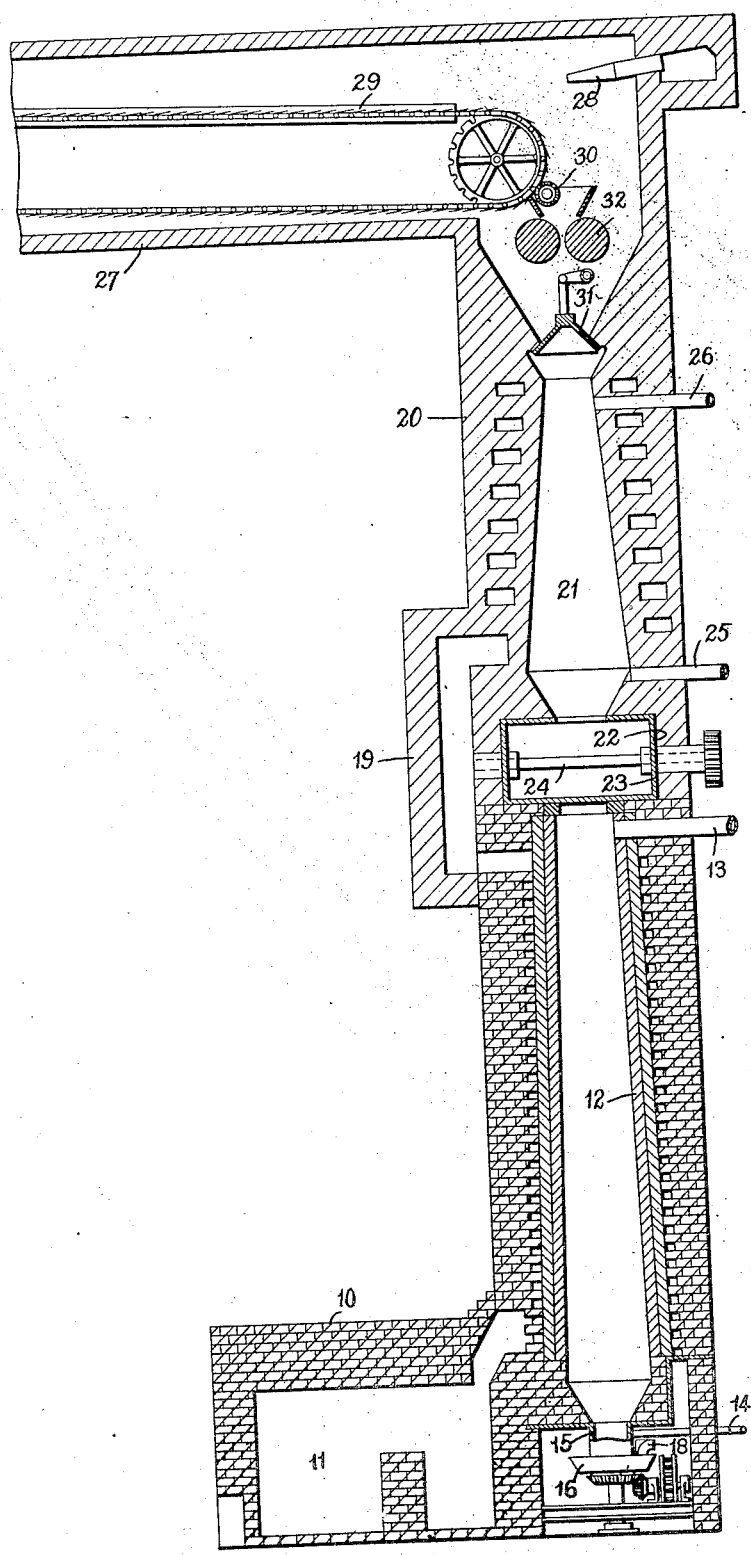

1,600,216

UNITED STATES PATENT OFFICE.

RICHARD J. DEARBORN, OF SUMMIT, NEW JERSEY, ASSIGNOR TO THE TEXAS COMPANY, OF NEW YORK, N. Y., A CORPORATION OF TEXAS.

MANUFACTURE OF ALUMINUM CHLORIDE.

Original application filed November 29, 1921, Serial No. 518,540. Divided and this application filed February 26, 1925. Serial No. 11,646.

This invention relates to the production of metal chlorides and has particular reference to the preparation of anhydrous aluminum chloride in relatively large quantities and of a high degree of purity, and is a division of my copending application, Serial Number 518,540, filed November 29, 1921, for improvements in manufacture of aluminum chloride.

The aluminum ores which are frequently used in the preparation of aluminum chloride commonly contain a greater or less amount of impurities, chief among which are iron compounds. If such ores be treated with chlorin under conditions to form aluminum chloride, the resultant product will contain chlorides of iron or of other metals which may be present in the aluminum ores.

In accordance with my invention the aluminum ore is treated to remove therefrom the iron and other impurities and the purified alumina is then chlorinated to produce an aluminum chloride uncontaminated with iron compounds.

The invention relates particularly to the production of the chloride in a continuous manner. In the large scale production of aluminum chloride, it is advantageous to maintain the reaction chamber in continuous operation for some time and in accordance with my invention the aluminum ore is simultaneously preheated and treated to remove impurities and the aluminum ore thus heated and purified is continuously charged into a chlorination retort wherein the ore is treated to produce aluminum chloride, the ash formed in the reaction being continuously removed from the retort and the chloride vapors condensed and collected.

One phase of the invention consists in carrying on the preheating and purifying of the ore by means of waste heat from the alumina chlorinating retort, thereby conducting the preliminary treatment of the ore with a minimum of expense. Another feature of the invention is the coking of the aluminum ore with carbonaceous material in the presence of a chlorinating agent so that impurities such as iron chloride may be removed from the ore during the coking step.

I will now proceed to describe the invention in detail, reference being had to the single figure of the accompanying drawing which is a sectional elevation of apparatus constructed in accordance with the invention.

In the apparatus thus illustrated a furnace 10 having a combustion chamber 11, is arranged to supply heat, preferably through checkered brick work, to a retort 12 which is constructed of suitable refractory material. The aluminum choride vapors are removed by a vapor line 13 to suitable condensers or collecting vessels. Chlorin gas or other chlorinating agent is supplied to the retort by means of a pipe 14 which preferably enters near the bottom of the retort. As illustrated, the pipe communicates with an extension 15 formed at the bottom of the retort and which depends into a rotatable pan 16. A plough 18 is arranged to remove material in the pan to a predetermined depth so that a certain amount of material may remain in the pan to form a seal preventing either the ingress or egress of gases to or from the retort while at the same time allowing the excess ash to be discharged over the rim of the pan. This arrangement makes possible the continuous operation of the retort.

A flue 19 removes the spent combustion gases, which have been employed in heating the retort 12, and delivers these gases into a heating chamber 20 in which is mounted the purifying retort or chamber 21. The retort 21 is preferably superposed above the retort 12 in such manner that material may readily be transferred from the upper to the lower retort. In the arrangement illustrated the products discharged from the retort 21 enters the hopper 22 having a continuously operated gate 23 controlled by a shaft 24 which may be operated by any suitable mechanism. It is to be understood that any convenient arrangement for transferring materials from one retort to another may be used, but it is desirable to so design the apparatus as to reduce to a minimum the passage of gas from the alumina chlorinating retort into the purifying retort or vice versa. The retort 21 is equipped with a pipe 25 for introducing the chlorinating agent and a conduit 26 for removing the iron chloride vapors or other vaporous products resulting from the preliminary treatment of the aluminum ore.

An oven 27 supplied with heat by means of a burner or heat conduit 28 or by any other suitable means, is provided to preheat and coke the mixture of aluminum ore and reducing agent which it is desired to chlorinate. A conveyor 29 is adapted to continuously convey material to be coked through the oven 27. The resultant coke is removed from the conveyor by any suitable mechanism, such as a rotatable scraper 30, and then discharged through a hopper 31 into the retort 21. If desired, the coked product may be passed between rollers 32 for the purpose of crushing the coke into the size desired.

In using the apparatus illustrated an aluminum ore, such as bauxite, aluminum silicate, or other alumina containing clay, is mixed with carbonaceous material and then coked in the oven 27. The coked product may then be charged into the retort 21 which is preferably heated by the waste gases, which have been used in heating the retort 12 and is therefore maintained at a lower temperature than that of the lower retort. Hydrochloric acid gas or chlorin, or other chlorinating agent, is introduced through the conduit 25. Iron oxid present in the aluminum ore is thus chlorinated and the resulting iron chloride passes through the vapor line 26. Other impurities in the aluminum ore which are more readily attacked by chlorin than alumina are also removed from the aluminum ore in the retort 21.

The aluminum ore thus purified is continuously charged into the retort 12 wherein it is subjected to the action of chlorin or other chlorinating agent under a much higher temperature than that obtaining in the preliminary retort. The temperature maintained is sufficient to cause the reaction between alumina and chlorin resulting in the production of aluminum chloride vapors which are removed through the vapor line 13.

In a modified form of the invention the retort 21 may be omitted and a chlorinating agent introduced directly into the coking oven 27, that is, the coking is carried on in an atmosphere of chlorin or hydrochloric acid gas or the like, so that the iron and other impurities may be attacked by the chlorinating agent and thus removed from the aluminum ores. In this manner coking of the mixture of alumina and carbonaceous material and chlorination of the reactive iron compounds and elimination thereof from the coked alumina proceed simultaneously. Although the retort 21 may be omitted in case it is desired to use this form of the invention, this may also be accomplished by maintaining the hopper 31 in an open position and closing the conduit 26 so that chlorin from the pipe 25 may pass into the oven 27 to accomplish chlorination of the reactive iron compounds. The coked product is removed from the oven 27 before any substantial portion of alumina is attacked and is discharged directly into the main retort 12 in which formation of aluminum chloride occurs.

While I have described a specific form of apparatus and described the details of the process which I now consider most desirable I intend that only such limitations be imposed as indicated in the appended claims.

What I claim is:

1. In combination with a main retort adapted for the continuous treatment of materials for the production of aluminum chloride, an oven in which an alumina-carbon mixture may be coked, means for admitting a chlorinating agent into said oven, and means for continuously transferring the heated coked product from the oven into the main retort.

2. In combination with a main retort adapted for the continuous treatment of materials for the production of aluminum chloride, an oven in which an alumina-carbon mixture may be coked, means for continuously transporting the mixture through the oven, means for admitting a chlorinating agent into the oven and means for continuously transferring the heated coked product into the main retort.

3. The process of making aluminum chloride which consists in simultaneously coking and purifying a mixture of aluminum ore and carbonaceous material by heating and chlorinating at a relatively low temperature, and then without loss of heat chlorinating the purified coked mixture at a relatively high temperature.

4. The process of making aluminum chloride which consists in simultaneously coking and purifying a mixture of aluminum ore and carbonaceous material by heating and chlorinating under conditions such that no substantial chlorination of aluminum occurs, and then without loss of heat chlorinating the purified coked mixture under such conditions as to produce aluminum chloride.

5. The process of making aluminum chloride which consists in continuously and simultaneously coking and purifying a mixture of aluminum ore and carbonaceous material by heating and chlorinating, in an oven provided therefor, under conditions such that no substantial chlorination of aluminum occurs, continuously transferring the hot purified mixture from the oven to a retort, chlorinating the purified coke mixture in the retort under such conditions as to produce aluminum chloride, and continuously withdrawing the reaction products.

In witness whereof I have hereunto set my hand this 25th day of February, 1925.

R. J. DEARBORN.